United States Patent
Adler et al.

[15] 3,662,589
[45] May 16, 1972

[54] ULTRASONIC FLAW DETERMINATION BY SPECTRAL ANALYSIS

[72] Inventors: Laszlo Adler, Knoxville; Hubert L. Whaley, Powell, both of Tenn.

[73] Assignee: The United States of America as represented by the United States Atomic Energy Commission

[22] Filed: Feb. 2, 1971

[21] Appl. No.: 111,958

[52] U.S. Cl. .................................................73/67.8
[51] Int. Cl. ......................................................G01n 29/04
[58] Field of Search .................73/67.7, 67.8 R, 67.8 S, 67.9

[56] References Cited

UNITED STATES PATENTS 2,893,239  7/1959  Renaut ..................................73/67.7
3,221,544  12/1965  Gunkel ..................................73/67.8
3,415,110  12/1968  Cowan ...................................73/67.8

*Primary Examiner*—James J. Gill
*Attorney*—Roland A. Anderson

[57] ABSTRACT

A method of quantitatively determining the size and orientation of flaws within a material. A broadband pulse having a frequency width of at least several MHz is used for an input pulse from a transducer which is directed toward the test material which may contain a flaw, and the average frequency interval between interference maxima in the reflected spectrum is relatable to both the size and the orientation of the flaw. An experimental method using two known angle changes allows determination of the size and angle of randomly oriented discontinuities within metal specimens.

3 Claims, 8 Drawing Figures $$\Delta f = \frac{\Delta f_1 + \Delta f_2 + \Delta f_3 + \Delta f_4}{4}$$

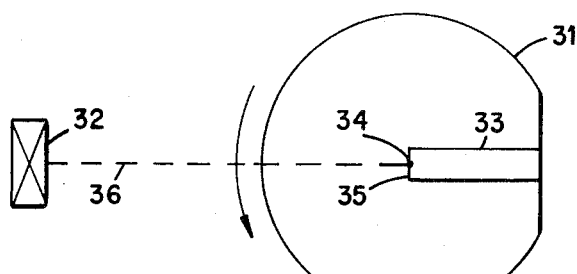
Fig. 4
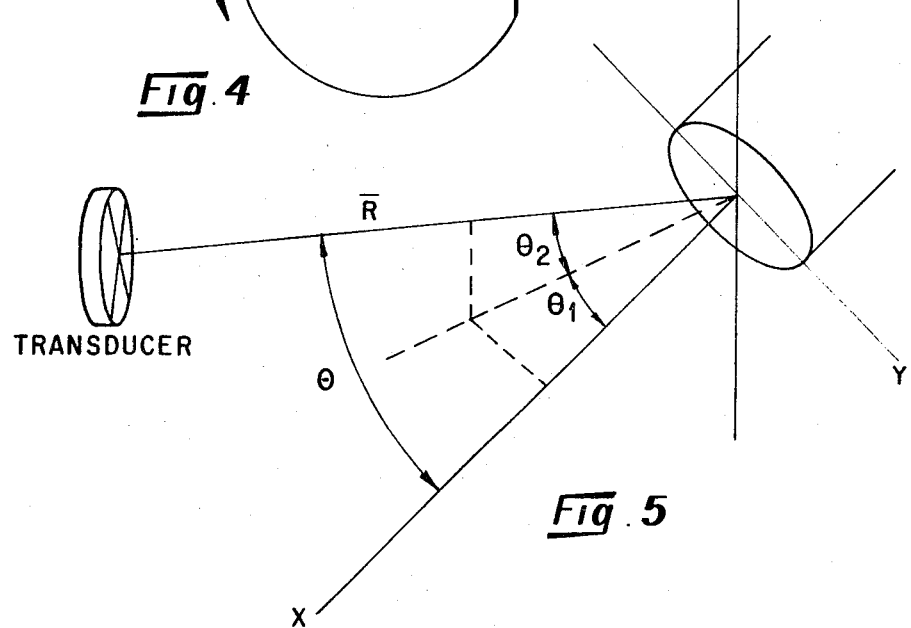
Fig. 5
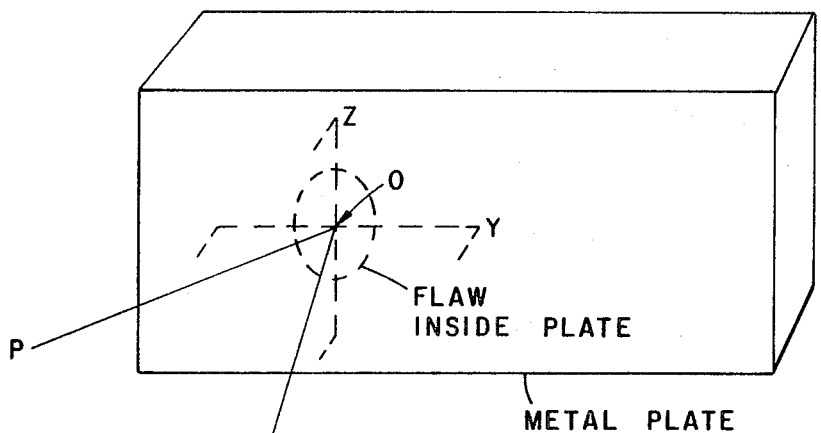
Fig. 6
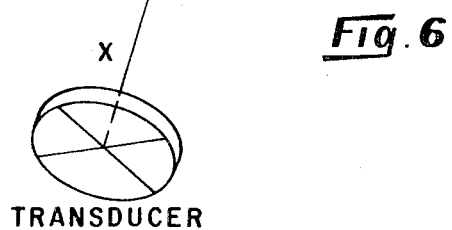

3,662,589

ULTRASONIC FLAW DETERMINATION BY SPECTRAL ANALYSIS

BACKGROUND OF THE INVENTION

This invention was made in the course of, or under, a contract with the U. S. Atomic Energy Commission.

Determining the size of a flaw ultrasonically detected in a material is a major problem. The amplitude of an ultrasonic pulse that has interacted with the discontinuity in the material is usually used as an indication of the size of the flaw. In general, one expects the signal reflected from a large flaw to have a larger amplitude than that from a smaller flaw. Conversely, if a through-transmission technique is used, one expects the signal received after propagating through or around a larger flaw to be smaller than that from a smaller flaw. The problem is not this simple, however, since the amplitude is affected by a number of factors other than the physical size of the reflecting discontinuity (e.g., its orientation and composition and energy losses in the material at other interfaces and due to attenuation). For example, a small flaw oriented normal to the axis of the incident ultrasonic beam might appear larger than a much larger flaw lying at an angle that is less favorable for reflecting energy to the receiver. The amplitude of the energy reflected from the surface of a discontinuity in a material also depends on the relative acoustic impedances on either side of the interface; the greater the difference in acoustic impedance, the greater is the percentage of reflection. Therefore, a relatively small discontinuity, for example, if it is in effect an interface between metal and air (such as a crack, nonbond, or void), may reflect more energy than a much larger metallic inclusion.

Thus, in the prior art, there has been only a very limited capability for characterizing flaws of any orientation or size without the requirement of very specialized calibration standards.

It should be noted that the ultrasonic frequency analysis system utilized in the present invention has been described in an AEC report, No. ORNL-TM-2655, issued September 1969. However, the present invention relates to a unique method of utilizing the output of such an ultrasonic frequency analysis system for quantitatively determining the size and orientation of flaws in a material which is outside the scope of the above-mentioned report.

SUMMARY OF THE INVENTION

It is the object of the present invention to provide a method for accurately and non-destructively determining the size and orientation of a flaw within a material.

The above object has been accomplished in the present invention by generating an ultrasonic pulse having a wide frequency spectrum by a transducer which may be immersed in water, receiving with the same transducer ultrasonic signals reflected from any flaw in the material sample under test which may also be immersed in the water in close proximity to the transducer, analyzing the frequency spectrum of the reflected signals to determine the average frequency interval between points of maxima in the reflected spectrum, displacing the transducer a selected angle in a first plane from its first position with respect to the sample and then repeating the above steps, displacing the transducer a second selected angle in a second plane perpendicular to the first plane and from its first position with respect to the sample and then repeating the above steps to determine the average frequency interval again, and finally utilizing the average frequency intervals obtained for all positions of the transducer for determining the size and orientation of the flaw in the sample in a manner to be described hereinbelow.

BRIEF DESCRIPTION OF THE FIGURES

FIG. 4 is a drawing illustrating a second type of specimen utilized to evaluate the single-angle method of the present invention.

FIG. 5 is a drawing illustrating the relative orientation of the transducer and reflector utilized to carry out the two-angle method of the present invention.

FIG. 6 and FIG. 7 further illustrate the two-angle method of determining the size and orientation of a randomly oriented flaw in a sample material.

DESCRIPTION OF THE PREFERRED EMBODIMENTS

Figure 1:
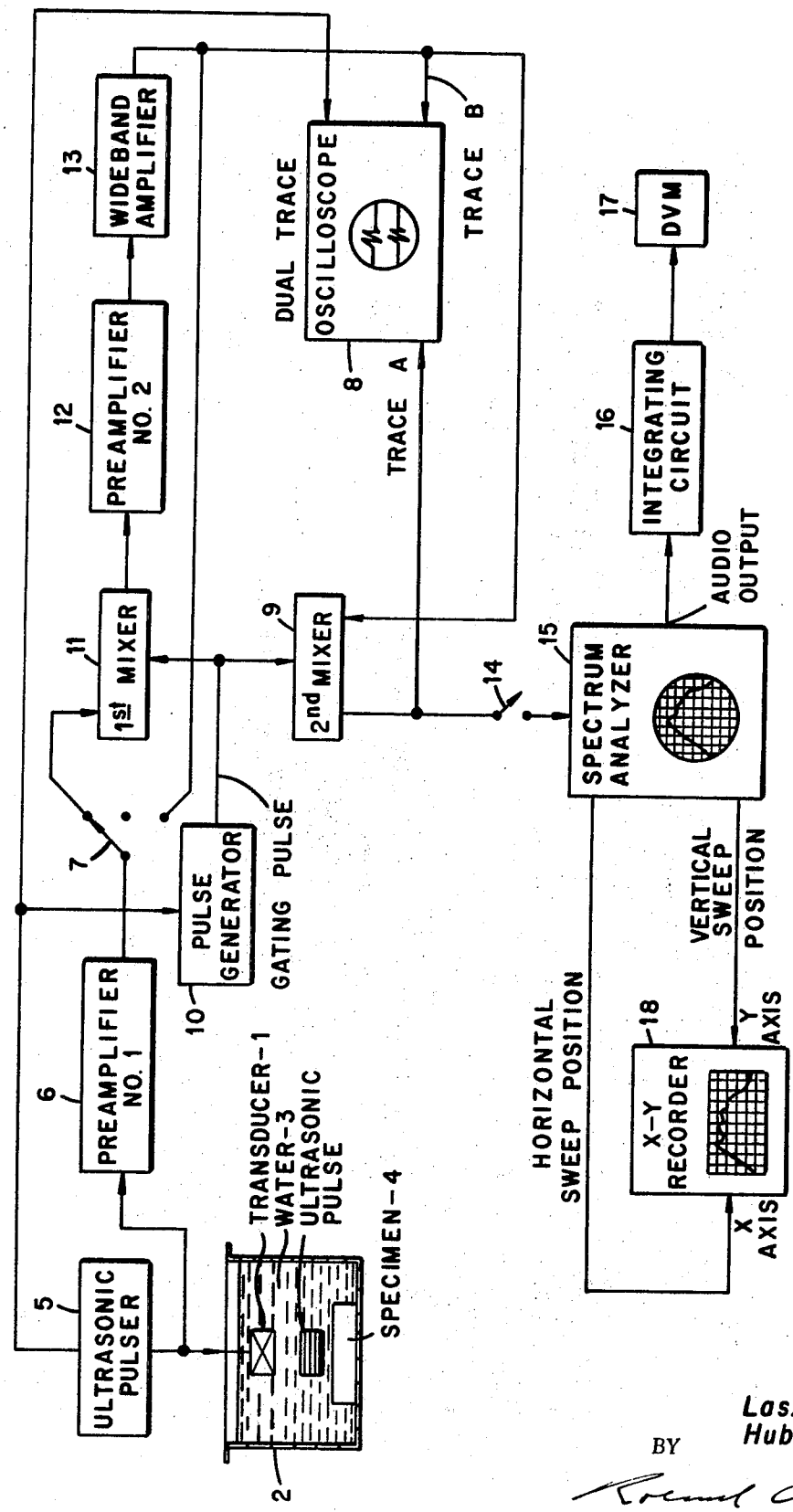
FIG. 1 is a block diagram of an ultrasonic frequency analysis system utilized in the present invention.

Referring to FIG. 1, wherein an ultrasonic immersion inspection system is illustrated, a pulser-receiver (pulse-echo) transducer 1 is positioned within a vessel 2 containing a liquid 3 such as water, for example. It should be noted that many of the principles and results to be described attain logically also for the cases of contact ultrasonic methods, immersion ultrasonic methods in fluids other than water, and multiple transducer methods. It should be understood that several types of transducers may be utilized. For example, a lithium sulfate, ceramic, or quartz transducer may be used. The transducer may have a diameter of 0.75 inch, for example. Positioned also in the liquid 3, and in proximity to the transducer 1, is a specimen 4 of the material under investigation. A high voltage (500–1700 volt) pulse from a pulser 5 (Curtis Wright, 424A) excites the transducer 1 and this pulse, together with any reflected pulses, is impressed upon a first preamplifier 6 (Tektronix Type L). The preamplifier 6 is saturated by the excitation pulse but recovers and amplifies, without distortion, the reflected pulses as derived from the front and rear surfaces of the specimen 4 as well as internal discontinuities (flaws) within the specimen 4.

If the pulse of interest (from the flaw) is sufficiently large, the switch 7 following preamplifier 6 is put in the lower position, and all pulses are displayed on the "B" trace of a dual-trace oscilloscope 8 (Tektronix, 545). The pulses are also directed into a solid-state mixer 9 (Anzac Electronics, ASM-10) which operates as a pedestal-free gate. The output of a pulse generator 10 (Hewlett-Packard, 214–A), synchronized with the ultrasonic pulser 5, is connected to a second input of the mixer 9. There is an output at the third terminal of mixer 9 when the arrival time of this gating pulse coincides with one of the rf pulses. This output is displayed on trace "A" of the oscilloscope 8 so that the signal to be analyzed can be selected by adjusting the timing of the gating pulse.

If additional amplification of the signal pulse is needed, the switch 7 can be set to connect the signals through another mixer 11 (Anzac Electronics, ASM-10) to a second preamplifier 12 (Tektronix, 53B) and a wideband amplifier 13 (Hewlett-Packard, 460AR) before going to the mixer 9. It was necessary to use a mixer between the preamplifier for isolation and to screen out larger pulses. The second preamplifier 12 alone produces about a tenfold increase in the amplitude of very small signals.

The gated signal from the mixer 9 is applied, through switch 14, to a spectrum analyzer 15 (Singer Co., Metrics Div., Spa-3/25a) which produces on a cathode ray tube thereof a display of the relative amplitude as a function of frequency. The frequency range of this instrument is 0–25 MHz, and adjustable center-frequency and bandwidth controls permit the examination of any portion of a displayed spectrum in detail. Frequency markers may be displayed on the cathode ray tube along with the spectrum. An integrator circuit 16 gives a direct current voltage on a digital voltmeter 17 which is directly proportional to the area (or average amplitude) under a spectrum envelope, allowing a single number to be attached to a given display. When permanent recordings of the displayed spectrum are desired, an X-Y recorder 18 is used. The above-described ultrasonic frequency analysis system is described in the above-mentioned report, No. ORNL–TM–2 655, and no novelty is claimed for this system per se.

Figure 2:
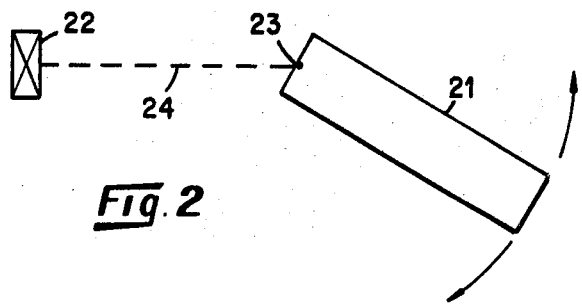
FIG. 2 is a drawing illustrating one type of specimen utilized to evaluate the single-angle method of the present invention.

Two types of experiments were conducted using the above-described apparatus to determine the relationship of size and orientation to the observed reflected frequency spectrum. The first type of experiment is illustrated in FIG. 2. Flat-ended rods were prepared from several materials and of varying diameters. Each was positioned as a specimen 21 near a transducer 22. Provision was made to rotate the rod specimen about point 23 so as to shift the angle of orientation of the rod end with respect to the incident ultrasound beam 24. The rods were fabricated from brass, copper, aluminum, and Plexiglass and ranged in size from 0.021 inch to 0.750 inch in diameter. Only the end of the rod was used as a reflector. Straightforward application of the technique requires that the reflector be located in the "far field" or uniform portion of the ultrasonic beam. In the present case this requires a distance of 6 inches or greater (of water). The commonly accepted approximation for the distance to the far field is $a^2/\lambda$ where $a$ is the radius of the circular sound source and $\lambda$ is the wavelength of the ultrasound in the material. Due to the increased ultrasonic velocity in metals such as aluminum and steels, it should be noted that the near field distance is reduced by about a factor of four for propagation in these materials. For the reflection experiments with rods, the transducer-to-specimen spacing was typically 6 inches.

Figure 3:
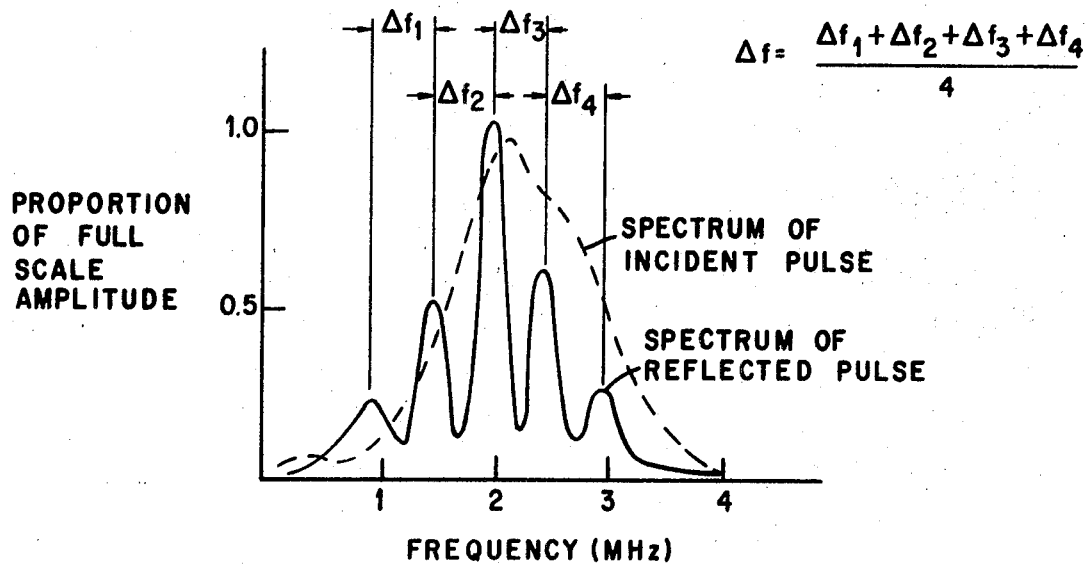
FIG. 3 is a drawing illustrating a typical reflected frequency spectrum as obtained with the system of FIG. 1.

It was observed that while the input ultrasound wave contained a wide band of frequencies, having a nearly Guassian amplitude distribution between about 0.5 to 4.0 MHz, the reflected spectrum had pronounced amplitudes (maxima) at certain frequencies, and these frequencies varied with size and orientation of the rod ends. This is illustrated in FIG. 3, wherein the shapes of the incident beam and a typical reflected beam are shown. The reflected beam is from a rod of 0.188 inch diameter at an angle of 18.3°.

Using the data thus obtained (of the frequency of various maxima) an equation for flaw size (expressed as diameter, $d$) was derived, as follows:

$$d = \frac{v}{\left(2 \sin \theta + \frac{a}{D}\right)\Delta f}, \quad (1)$$

where:

$v$ = velocity of sound in the material in which it is propagating when the reflecting surface is encountered;
$\theta$ = angle of orientation of reflecting discontinuity with respect to the incident ultrasound beam;
$a/D$ = a constant derived from the transducer size and distance between transducer and reflector;
$\Delta f$ = average frequency interval between points of maxima in the spectrum; and
$d$ = diameter of the reflector.

The effect of the term $a/D$ in expression (1) is second order (i.e., only a very small error is incurred by neglecting it).

Experiments were also performed with rods of non-circular cross section. These included squares, rectangles, and ellipses. The response was explainable by an equation similar to (1) in which the dimension replacing $d$ would be the largest dimension of the reflector perpendicular to the axis of rotation.

A second type of test specimen is shown in FIG. 4. The specimen 31 was generally cylindrical with a cylindrical surface oriented toward a transducer 32. The opposite side of the specimen contained a flat-bottomed cylindrical channel 33 drilled radially inwardly having a diameter of either 0.25 inch or 0.50 inch. Provision was made to rotate the specimen 31 about axis 34 so that the orientation of the plane of the bottom 35 of channel 33 is varied with respect to ultrasound beam 36 from the transducer 32. The cylindrical surface of the specimen was chosen so that the angle of incidence of the beam 36 to the exterior surface remained constant as the orientation of the "flaw" was varied. The type of flaw in this test specimen is more like those to be found in actual practice.

The results obtained using this second type of specimen are shown in Table I, as follows.

TABLE I

| Actual Hole Size (in.) $\theta$ | Positions of Interference Maxima (MHz) | Av. $\Delta f$ (MHz) | Calculated Diameter (in.) | Av. of Calculated Diameter (in.) |
|---|---|---|---|---|
| 0.500 0° | — | — | — | — |
| 0.500 5° | — | — | — | — |
| 0.500 10° | 1.26, 2.41 | 1.23 | .509 | |
| 0.500 15° | 0.85, 1.78, 2.60, 3.33 | 0.87 | .502 | |
| 0.500 20° | 1.36, 1.99, 2.71 | 0.68 | .500 | |
| 0.500 25° | 1.05,1.66,2.22,2.80,3.39 | 0.57 | .489 | 0.497 |
| 0.500 30° | 0.87,1.35,1.87,2.39,2.87 | 0.48 | .495 | |
| 0.500 35° | 0.81,1.20,1.64,2.06,2.51 | 0.44 | .476 | |
| 0.500 40° | 1.13, 1.49, 1.84, 2.25 | 0.37 | .507 | |
| 0.250 0° | — | — | — | — |
| 0.250 5° | — | — | — | — |
| 0.250 10° | — | — | — | — |
| 0.250 15° | 1.60, 2.99 | 1.50 | .291 | |
| 0.250 20° | 1.28, 2.43 | 1.21 | .281 | |
| 0.250 25° | 0.98, 2.02, 3.09 | 1.01 | .276 | |
| 0.250 30° | 0.91, 1.80, 2.66 | 0.90 | .264 | 0.269 |
| 0.250 35° | 1.59, 2.37, 3.17 | 0.80 | .262 | |
| 0.250 40° | 1.37, 2.14, 2.84 | 0.71 | .264 | |
| 0.250 45° | 1.20, 1.94, 2.72, 3.33 | 0.70 | .243 | |

A diameter of the "flaw" (the bottom 35 of channel 33) was calculated using the above equation with the observed $\Delta f$ and measured $\theta$. It can be seen that the average calculated size is very close to the actual size. In the above-mentioned tests, the frequency at the maximum amplitudes was obtained from the spectrum analyzer of FIG. 1, and the average $\Delta f$ and $d$ were "hand calculated."

It is recognized that in the inspection for hidden defects in materials both the size and orientation will be unknown. Accordingly, the material will be scanned until a flaw is detected. Using the observed $\Delta f$, a size is computed in terms of an unknown angle. The transducer will then be shifted to give a known change in orientation with the sample. A new value for $\Delta f$ will be obtained, but the size remains the same. The new angle is $\theta + \Delta\theta$ so that the two equations can be solved to determine the value of $\theta$ and of $d$. A simple computer program was written to solve this case for both $\theta$ and $d$. The second order term "$a/D$" [Eq. (1)] was neglected. Table II shows the results for the aluminum specimens described above.

TABLE II

Simultaneous Determination of Size and Angle for Discontinuities in an Aluminum Sample Hole Size ($d$) and Angle ($\theta$)

| Actual | | Determined | |
|---|---|---|---|
| $d$ (in.) | $\theta$ (deg) | $d$ (in.) | $\theta$ (deg) |
| 0.250 | 15 | 0.254 | 19 |
| 0.250 | 25 | 0.233 | 30.5 |
| 0.250 | 30 | 0.265 | 30 |
| 0.500 | 10 | 0.492 | 12 |
| 0.500 | 20 | 0.492 | 21.5 |
| 0.500 | 30 | 0.535 | 28 |

The above discussions considered only a single angle (in a horizontal plane) to describe the relative orientation between the transducer and reflector. This was possible because the experimental arrangements allowed the axes of both the transducer and reflector to be kept in the same horizontal plane as the turntable apparatus was adjusted to give an angle other than 0° between them. Should either axis be taken out of the horizontal plane, an additional angle would be introduced. In general, a flaw at a random angle with respect to the surface of a material containing the flaw would require not one but two such angular components to describe its orientation. Therefore, it is necessary to generalize the technique in order to assure its application to randomly oriented flaws.

FIG. 5 is a schematic representation of the problem. The reflector (illustrated as a flat end of a rod) lies in the yz plane centered at the origin of an xyz coordinate system. For normal incidence, the axis of the transducer would lie along the x axis. The angle produced by angulating the rod while keeping its axis in a horizontal plane and the center of its end at the origin is equivalent to that produced by keeping the rod fixed and angulating the axis of the transducer in the xy plane through the angle $\Theta_1$. The second angle, as discussed above, may then be produced by moving the axis of the transducer through an angle $\Theta_2$ in a vertical plane while causing it to continue to pass through the origin (that is, maintain centering). The angle $\Theta$ represents the composite angle between the axes.

The addition of the angle $\Theta_2$, of course, causes further changes in the spectrum of the reflected pulse. It has been determined that the resulting pattern could still be described by an equation of the same form as shown above with the angle $\Theta$ replaced by the angle $\Theta$ to indicate an angular component in two perpendicular planes, as shown in the following equation:

$$d = \frac{v}{(2 \sin \Theta) \Delta f}. \quad (2)$$

The value for the composite angle $\Theta$ is obtained from the following equation:

$$\Theta = \sin^{-1}[\sin^2\Theta_2 + \cos^2\Theta_2 \sin^2\Theta_1]^{1/2}. \quad (3)$$

The results of a test of this relationship at a 6-inch water path with a 0.281-inch-diameter flat-ended rod are summarized in the following table.

TABLE III

| Incident Angles (deg.) | | Composite Angle, $\theta$ (deg.) | Average Frequency Interval (MHz) | Diameter of Reflector, in. | |
|---|---|---|---|---|---|
| $\theta_1$ | $\theta_2$ | | | actual | calculated |
| 8.4 | 0 | 8.4 | 0.62 | 0.281 | 0.280 |
| 11.4 | 0 | 11.4 | 0.50 | 0.281 | 0.267 |
| 14.7 | 0 | 14.7 | 0.40 | 0.281 | 0.265 |
| 8.4 | 5 | 10.5 | 0.53 | 0.281 | 0.272 |
| 11.4 | 5 | 12.5 | 0.44 | 0.281 | 0.278 |
| 14.7 | 5 | 16.2 | 0.37 | 0.281 | 0.272 |
| 8.4 | 10 | 13.5 | 0.42 | 0.281 | 0.274 |
| 11.4 | 10 | 15.0 | 0.37 | 0.281 | 0.281 |
| 14.7 | 10 | 18.2 | 0.32 | 0.281 | 0.275 |

As can be seen from the above table, the diameter of the reflector calculated from Equation (2) agrees well with the true diameter over a wide range of values for the angles $\Theta_1$, $\Theta_2$, and $\Theta$.

In order to determine the size and orientation of an unknown randomly oriented flaw in a material, the following procedure is utilized. Consider the case illustrated in FIG. 6, in which a randomly oriented flaw lies within a metal plate. A coordinate system may be taken with its origin, O, at the center of the flaw, whose axis is the line OP. For simplicity, the coordinates were chosen to be parallel to the sides of the specimen plate. Let the original position of the transducer axis lie along the X axis and thus have normal incidence to the face of the metal plate. It is assumed that the flaw is located by scanning across the plate in the Y direction, indexing in the Z direction, and scanning back in the Y direction, etc., to cover the plate.

Figure 7:
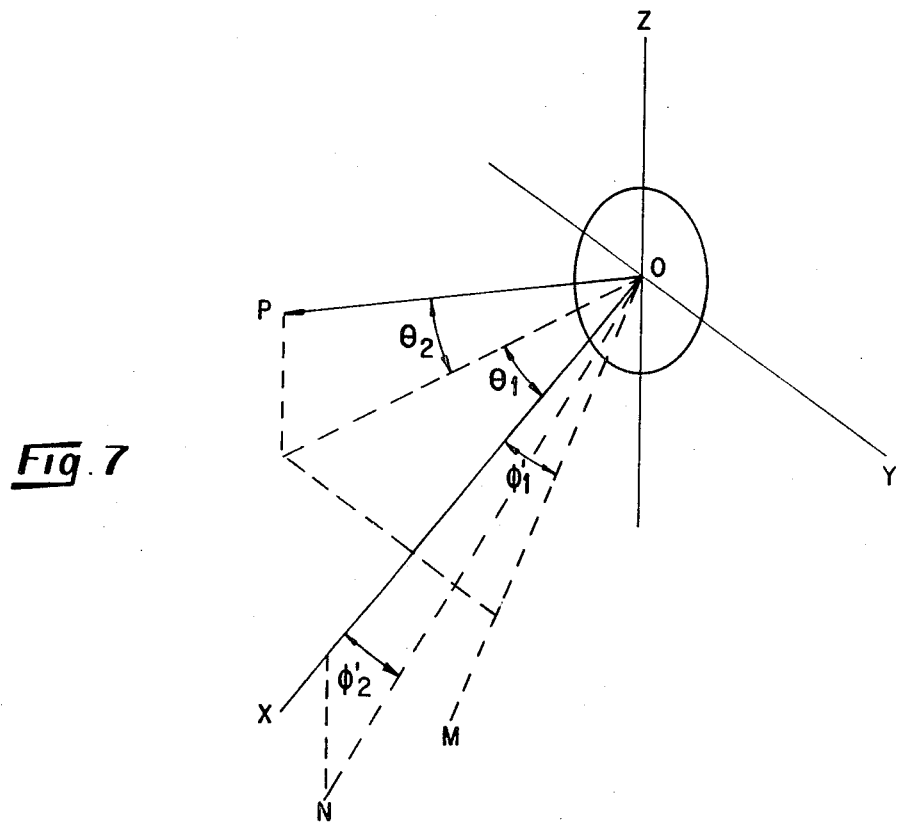

FIG. 7 is a detailed drawing of the general configuration of FIG. 6. The unknown quantities that are to be determined are the size of the flaw $d$, and the size of the angles $\Theta_1$ and $\Theta_2$ that define its orientation with respect to the coordinate system. Since three unknown quantities are to be determined, three different measurements will need to be made to determine them in the following manner.

Step 1: With the axis of the transducer coincident with the X axis, a set of frequency maxima will be present, and the average interval is given by:

$$\Delta f = \frac{Vm}{[2(\sin^2\theta_2 + \cos^2\theta_2 \sin^2\theta_1)^{1/2}]d} \quad (4)$$

in view of Equations (2) and (3) above. The value of $\Delta f$ should be recorded.

Step 2: The mechanism supporting the transducer, not shown, is then adjusted to cause the axis thereof to have a known angle of incidence, $\Phi_1$, to the surface of the plate in the XY plane; the transducer is then recentered on the flaw. The beam axis now lies along the line OM. The refracted angle in the metal due to the angle of incidence $\Phi_1$ is:

$$\phi_1' = \sin^{-1}\left[\frac{Vm}{Vw} \sin \phi_1\right]. \quad (5)$$

At this position, the average interval $\Delta f_1$ is given by:

$$\Delta f_1 = \frac{Vm}{\{2[\sin^2\theta_2 + \cos^2\theta_2 \sin^2(\theta_1 \pm \phi_1')]^{1/2}\}d}. \quad (6)$$

In FIG. 7, the angle of incidence $\Phi_1'$ lies in such a direction that it would be added to the angle $\Theta_1$, since it increases the angular component in the XY plane. The value of $\Delta f_1$ should also be recorded.

Step 3: The transducer is next adjusted to give a second known incident angle, $\Phi_2$, to the plate surface, this time in the XZ plane, and then recentered once again. The refracted angle in the metal due to the angle of incidence $\Phi_2$ is:

$$\phi_2' = \sin^{-1}\left[\frac{Vm}{Vw} \sin \phi_2\right]. \quad (7)$$

The average frequency interval in this position is:

$$\Delta f_2 = \frac{Vm}{\{2[\sin^2(\theta_2 \pm \phi_2') + \cos^2(\theta_2 \pm \phi_2') \sin^2(\theta_1 \pm \phi_1')]^{1/2}\}d}. \quad (8)$$

With $\Phi_2'$ in the direction shown in FIG. 7, it would be added to the angle $\Theta_2$ in Equation (8). The value of $\Delta f_2$ should be recorded. It should be understood that the above average frequency intervals, $\Delta f$, $\Delta f_1$, and $\Delta f_2$, are obtained utilizing the frequency spectrum analyzer of FIG. 1.

Equations (4), (6), and (8) are the three equations in the three unknowns that are needed to solve for $d$, $\Theta_1$, and $\Theta_2$. The problem of deciding whether to use the plus or minus sign in these equations in a given case can be determined by a comparison of the recorded values of $\Delta f$, $\Delta f_1$, and $\Delta f_2$:

1. If $\Delta f_1 > \Delta f$, use $\Theta_1 - \Phi_1'$;
   If $\Delta f_1 < \Delta f$, use $\Theta_1 + \Phi_1'$.
2. If $\Delta f_2 > \Delta f_1$, use $\Theta_2 - \Phi_2'$;
   If $\Delta f_2 < \Delta f_1$, use $\Theta_2 + \Phi_2'$.

The first conclusion was drawn because the sine function increases as its argument increases. The second conclusion was based on the same reason and the assumption that the sine-squared term will predominate over the product of the cosine-squared and the other sine-squared terms in Equation (8).

Figure 8:
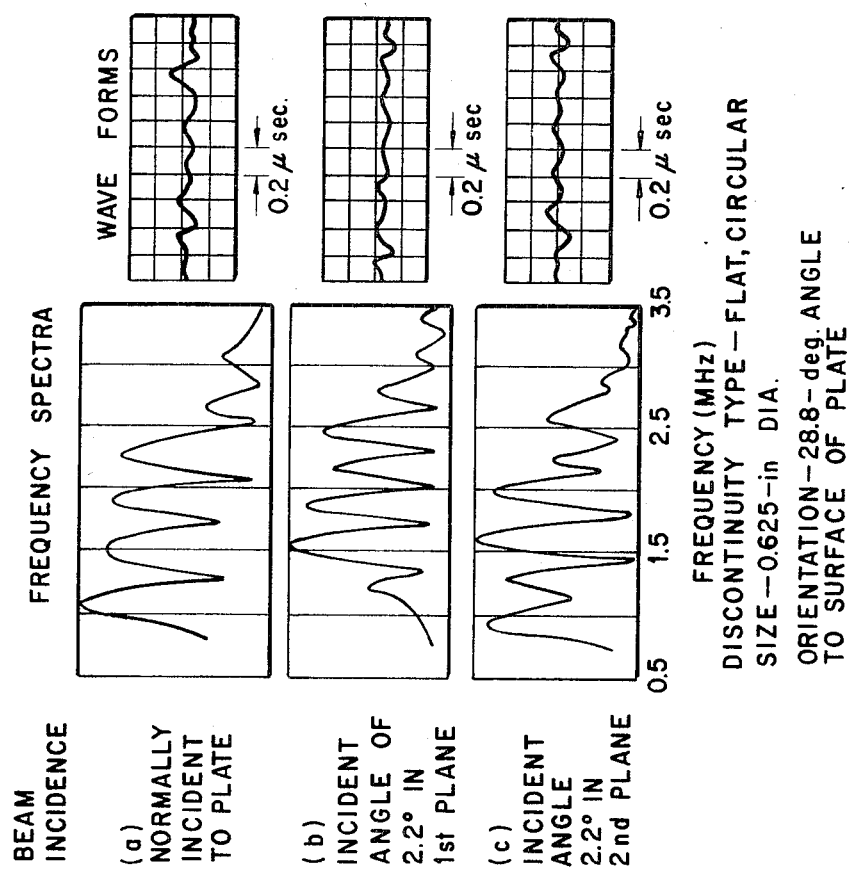
FIG. 8 illustrates the actual frequency spectra and waveforms obtained for a given drilled discontinuity in a steel test specimen.

The experimental method described above for a randomly oriented flat flaw lying beneath the surface of a flat plate was applied to a steel plate specimen 8.5in.× 7.5in.× 2.5in. in which a set of flat-bottomed cylindrical channels of various diameters had been drilled at various angles with respect to the surfaces. FIG. 8 shows the actual frequency spectra and signal waveforms obtained for one of the drilled discontinuities. The three parts of FIG. 8 correspond experimentally to Equations (4), (6), and (8). A computer program was developed for a simplified approximate solution to the three simultaneous equations. Table IV compares the experimental results so obtained to the actual values of reflector ("flaw") size and angle.

TABLE IV

A Comparison of the Actual Size and Angle of Each Artificial Flaw in a Steel Plate Specimen with the Experimental Values Determined from the Frequency Analysis Ultrasonic Technique

| | Hole Size (d) and Angle (θ) | | | |
|---|---|---|---|---|
| | Actual | | Experimental | |
| Hole No. | d (in.) | θ (deg) | d (in.) | θ (deg) |
| 1 | 0.250 | 18 | 0.241 | 22.4 |
| 2 | 0.313 | 31 | 0.361 | 30.1 |
| 3 | 0.375 | 9.7 | 0.347 | 13 |
| 4 | 0.438 | 18 | 0.468 | 18 |
| 5 | 0.563 | 9.5 | 0.626 | 7 |
| 6 | 0.625 | 28.8 | 0.621 | 27 |
| 7 | 0.250 | 0 | 0.253 | ~0 |

The total angles [as defined by Eq. (3)] are compared rather than the individual components $\Theta_1$ and $\Theta_2$.

For a basis for comparison, an amplitude (prior art) test was also performed on the above steel plate specimen according to established procedures (including use of a reference hole of known size with bottom parallel to the surface). As shown in Table V, this test gave no information on angle, and the size information was no indication at all of the actual size.

TABLE V

A Comparison of the Actual Size and Angle of Each Artificial Flaw in a Steel Plate Specimen with the Experimental Values Determined from an Amplitude Based Ultrasonic Technique

| | Hole Size (d) and Angle (θ) | | | |
|---|---|---|---|---|
| | Actual | | Experimental | |
| Hole No. | d (in.) | θ (deg) | d (in.) | θ (deg) |
| 1 | 0.250 | 18 | 0.113 | — |
| 2 | 0.313 | 31 | 0.083 | — |
| 3 | 0.375 | 9.7 | 0.175 | — |
| 4 | 0.438 | 18 | 0.121 | — |
| 5 | 0.563 | 9.5 | 0.189 | — |
| 6 | 0.625 | 28.8 | 0.108 | — |
| 7 | 0.250 | 0 | Ref. Hole | — |

In order to apply the above-described technique in a mechanized inspection to determine parameters of unknown flaws, a computer-controlled system could be employed. The computer would control the scanning and angular positioning of the transducer, extract the necessary data from the spectral characteristics, and perform the calculations necessary to characterize the flaw as to diameter and orientation. A complete system of this nature could then perform an inspection fairly rapidly.

As can be seen from the above-described invention, the use of frequency analysis to characterize flaws ultrasonically detected in materials offers distinct advantages over conventional methods. For the first time, it provides an ultrasonic method for a realistic determination of the size of a two-dimensional flaw regardless of its shape, orientation, or composition. Calibration standards are not needed, since losses at interfaces and due to attenuation in the sample are not involved in this technique. The only characteristic of the sample that must be known is its sonic velocity.

This invention has been described by way of illustration rather than limitation and it should be apparent that it is equally applicable in fields other than those described, e.g., in biomedical applications such as investigation of "discontinuities" (tumors, foreign objects, etc.,) in the human body.

What is claimed is:

1. A nondestructive method for determining the size and orientation of a randomly oriented flaw within a material sample comprising the steps of generating an ultrasonic pulse having a wide frequency spectrum by a transducer, receiving with the same transducer ultrasonic signals reflected from any flaw in said sample in close proximity to said transducer, analyzing the frequency spectrum of the reflected signals to determine a first average frequency interval between points of maxima in the reflected spectrum, recording said first average frequency interval, displacing the transducer a first selected angle in a first plane from its first position with respect to the sample and then repeating the above steps to determine a second average frequency interval between points of maxima in the second reflected spectrum, recording said second average frequency interval, displacing the transducer a second selected angle in a second plane and from said first position with respect to said sample and then repeating the above steps to determine a third average frequency interval between points of maxima in the third reflected spectrum, recording said third average frequency interval, and finally utilizing the recorded average frequency intervals obtained for all positions of said transducer for determining the size and orientation of the flaw in said sample.

2. The method set forth in claim 1, wherein said first average frequency interval is designated $\Delta f$, and wherein said first interval may be expressed by the equation:

$$\Delta f = \frac{Vm}{[2(\sin^2\theta_2 + \cos^2\theta_2 \sin^2\theta_1)^{1/2}]d},$$

where:

$Vm$ = velocity of sound in the sample in which it is propagating when the reflecting surface is encountered;

$\Theta_1$ = orientation of the flaw in said first plane with respect to a coordinate system;

$\Theta_2$ = orientation of the flaw in said second plane perpendicular to said first plane with respect to said coordinate system;

$d$ = diameter of said flaw;

and further wherein said second average frequency interval is designated $\Delta f_1$ and said third average frequency interval is designated $\Delta f_2$, said $\Delta f_1$ may be expressed by the equation:

$$\Delta f_1 = \frac{Vm}{\{2[\sin^2\theta_2 + \cos^2\theta_2 \sin^2(\theta_1 \pm \phi_1')]^{1/2}\}d},$$

where $\Phi_1'$ is equal to said first selected angle, said $\Delta f_2$ may be expressed by the equation:

$$\Delta f_2 = \frac{Vm}{\{2[\sin^2(\theta_2 \pm \phi_2') + \cos^2(\theta_2 \pm \phi_2')\sin^2(\theta_1 \pm \phi_1')]^{1/2}\}d},$$

where $\Phi_2'$ is equal to said second selected angle, whereby the unknown values of $d$, $\Theta_1$, and $\Theta_2$ are determined by solving said equations simultaneously by means of a computer.

3. The method set forth in claim 2, and further including the step of determining said points of maxima in said reflected spectrum for each position of said transducer by an electronic frequency spectrum analyzer.

* * * * *